(12) United States Patent
Sato et al.

(10) Patent No.: US 12,096,333 B2
(45) Date of Patent: Sep. 17, 2024

(54) DATA ANALYSIS SYSTEM AND DATA ANALYSIS METHOD

(71) Applicant: Nippon Telegraph and Telephone Corporation, Tokyo (JP)

(72) Inventors: Rieko Sato, Tokyo (JP); Takayuki Ogasawara, Tokyo (JP); Kenichi Matsunaga, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 393 days.

(21) Appl. No.: 17/612,488

(22) PCT Filed: May 28, 2019

(86) PCT No.: PCT/JP2019/021068
§ 371 (c)(1),
(2) Date: Nov. 18, 2021

(87) PCT Pub. No.: WO2020/240690
PCT Pub. Date: Dec. 3, 2020

(65) Prior Publication Data
US 2022/0225206 A1    Jul. 14, 2022

(51) Int. Cl.
*H04W 40/22* (2009.01)
*H04W 64/00* (2009.01)

(52) U.S. Cl.
CPC ......... *H04W 40/22* (2013.01); *H04W 64/003* (2013.01)

(58) Field of Classification Search
CPC ..... H04W 12/06; H04W 24/10; H04W 12/02; H04W 12/04; H04W 12/082;
(Continued)

(56) References Cited

U.S. PATENT DOCUMENTS

| 2003/0073448 A1* | 4/2003 | Ozeki | H04W 12/082 455/565 |
| 2006/0033674 A1* | 2/2006 | Essig | F24S 23/715 343/915 |

(Continued)

FOREIGN PATENT DOCUMENTS

| JP | 2017163366 A | 9/2017 |
| JP | 2019004273 A | 1/2019 |

OTHER PUBLICATIONS

Yoshioka, K., "Clinical Research of VR Device Program for Lower Limbs Rehabilitation," Clinical Study of VR Device Program for Lower Extremity Rehabilitation, Bulletin of JSSD, The Design Study of the Design Society of Japan, 2018, 5 pages.

*Primary Examiner* — Joseph Arevalo
(74) *Attorney, Agent, or Firm* — SLATER MATSIL, LLP

(57) ABSTRACT

A data analysis system includes relay apparatuses for communicating with a wireless terminal in a communication area of the relay apparatus, and a data analysis apparatus connected to the relay apparatuses through a communication network for analyzing data regarding the wireless terminal, wherein each relay apparatus includes a determiner for determining whether the wireless terminal is present in the communication area at fixed time intervals, a time imparter for imparting a time at which the determination is performed to a determination result, and a transmitter and receptor for transmitting the determination result to the data analysis apparatus with the imparted time, and the data analysis apparatus includes a transmitter and receptor for receiving the determination result and the imparted time, an analyzer for analyzing information on the wireless terminal at each time based on the time and the determination result, and a display for displaying an analysis result.

8 Claims, 17 Drawing Sheets

(58) Field of Classification Search
CPC ... H04W 12/12; H04W 12/126; H04W 12/30; H04W 12/50; H04W 12/61; H04W 12/63; H04W 16/26; H04W 24/08; H04W 48/20; H04W 56/0015; H04W 56/0025; H04W 76/14; H04W 76/30; H04W 8/005; H04W 8/26; H04W 84/045; H04W 84/18; H04W 88/02; H04W 88/04; H04W 88/085; H04W 88/16
USPC ................ 370/315, 329, 246, 513, 445, 565
See application file for complete search history.

(56) References Cited

U.S. PATENT DOCUMENTS

| | | | | |
|---|---|---|---|---|
| 2011/0184575 | A1* | 7/2011 | Kawamoto | H04L 67/125 714/49 |
| 2011/0184585 | A1* | 7/2011 | Matsuda | H04L 63/12 700/297 |
| 2011/0184586 | A1* | 7/2011 | Asano | H04L 63/08 700/297 |
| 2013/0281081 | A1* | 10/2013 | Kawaguchi | H04W 8/26 455/422.1 |
| 2014/0349569 | A1* | 11/2014 | Hyde | H04W 16/26 455/11.1 |
| 2015/0327204 | A1* | 11/2015 | Park | H04W 24/10 370/350 |
| 2019/0171187 | A1* | 6/2019 | Cella | G06N 3/126 |

* cited by examiner

DATA ANALYSIS SYSTEM AND DATA ANALYSIS METHOD

This patent application is a national phase filing under section 371 of PCT/JP2019/021068, filed on May 28, 2019, which application is incorporated herein by reference in its entirety.

TECHNICAL FIELD

The present invention relates to a data analysis system and a data analysis method, and particularly, to a technique for analyzing information on a wireless terminal that moves between relay apparatuses.

BACKGROUND

Hitherto, handover has been known as communication control for wireless terminals that move between relay apparatuses such as base station apparatuses. In addition, for example, Patent Literature 1 discloses a communication control technique for enabling seamless communication in which handover is unnecessary between communication areas of a plurality of relay apparatuses. Specifically, Patent Literature 1 discloses a technique in which key information for permitting communication is issued to a wireless terminal in a region including communication areas of a plurality of relay apparatuses, and the wireless terminal receiving the key information transmits data to the plurality of relay apparatuses in the region by performing broadcast communication.

Patent Literature 1 further discloses that, among the plurality of relay apparatuses that can receive the data transmitted from the wireless terminal in the region, a relay apparatus having the highest received signal strength indicator (RSSI) value transmits the data to a higher-level data processing apparatus. In this case, the data is not transmitted to the higher-level data processing apparatus from the relay apparatuses other than the relay apparatus having the highest RSSI value.

According to communication control in the related art, in a case where information on a wireless terminal is transmitted from only one relay apparatus to a higher-level data processing apparatus in one region, information on the wireless terminal in relation to the other relay apparatuses is not transmitted to the higher-level data processing apparatus. For example, in a case where data is analyzed using a wearable terminal or IoT technology, multilateral analysis is performed using a variety of data, and it may be important to multilaterally perform analysis even in a case where information on a wireless terminal moving between relay apparatuses is analyzed.

For example, biological information such as a heart rate and an amount of activity measured by a sensor such as a wearable terminal has been utilized in the fields of sports, medicine, and rehabilitation. In addition, there have been proposed various rehabilitation support techniques for grasping the state of a user who needs rehabilitation, such as a patient wearing a wearable terminal, and presenting information (see, for example, Non Patent Literature 1). In this manner, to ascertain that a user is in a specific state, it may also be important to check that the user is not in the specific state.

However, for example, in the technique disclosed in Patent Literature 1, although it is possible to acquire information indicating that a wireless terminal worn or carried by a user is present in a certain communication area, it is not possible to acquire information indicating that the user is not present in other communication areas. Thus, it is not possible to more accurately grasp information on the movement of the user in consideration of the fact that the user is not present in the certain communication area.

CITATION LIST

Patent Literature

Patent Literature 1: JP 2019-004273 A

Non Patent Literature

Non Patent Literature 1: Kiyomi YOSHIOKA "Clinical Research of VR Device Program for Lower Limbs Rehabilitation," Japan Society for Design Studies BULLETIN OF JSSD 2017, pp. 196-197

SUMMARY

Technical Problem

Embodiments of the present invention have been made to solve the above-described problems, and an object thereof is to more accurately grasp information on a wireless terminal that moves between relay apparatuses.

Means for Solving the Problem

In order to solve the above-described problem, a data analysis system according to embodiments of the present invention includes a plurality of relay apparatuses, each of the plurality of relay apparatuses being configured to communicate with a wireless terminal in a communication area, and a data analysis apparatus configured to analyze data regarding the wireless terminal, wherein each of the plurality of relay apparatuses includes a determination unit configured to determine whether or not the wireless terminal is present in the communication area, a time imparting unit configured to impart a time at which the determination is performed to a determination result obtained by the determination unit, and a transmission unit configured to transmit the determination result to the data analysis apparatus together with the imparted time, and the data analysis apparatus includes a second reception unit configured to receive the determination result together with the imparted time, and an analysis unit configured to analyze information on the wireless terminal at each time.

Further, in the data analysis system according to embodiments of the present invention, the plurality of relay apparatuses may be disposed in a predetermined region, each of the plurality of relay apparatuses communicating with the wireless terminal in the communication area of the relay apparatus, the data analysis apparatus may be connected to the plurality of relay apparatuses through a communication network and analyze data regarding the wireless terminal which is received from the plurality of relay apparatuses, each of the plurality of relay apparatuses may be configured such that the determination unit determines whether or not the wireless terminal is present in the communication area at fixed time intervals, and the data analysis apparatus may be configured such that the analysis unit analyzes information on the wireless terminal at each time, based on the time and the determination result.

Further, in the data analysis system according to embodiments of the present invention, each of the plurality of relay apparatuses may further include a first reception unit configured to receive information for identifying the wireless terminal from the wireless terminal in the communication area, and a first storage unit configured to store the information for identifying the wireless terminal, and the determination unit may determine that the wireless terminal is present in the communication area in a case where the received information for identifying the wireless terminal matches the information for identifying the wireless terminal stored in the first storage unit, and may determine that the wireless terminal is not present in the communication area in a case where the information for identifying the wireless terminal is not received.

Further, in the data analysis system according to embodiments of the present invention, the data analysis apparatus may be configured such that the second reception unit receives identification information specific to each of the plurality of relay apparatuses together with the time and the determination result, and the data analysis apparatus may further include a second storage unit configured to store a position of each of the plurality of relay apparatuses in the region, the position of each of the plurality of relay apparatuses being associated with the identification information of each of the plurality of relay apparatuses, and a position estimation unit configured to estimate a position in the region where the wireless terminal is present at the time, based on the time, the determination result, and the identification information of one of the plurality of relay apparatuses which is a transmission source of the determination result.

Further, in the data analysis system according to embodiments of the present invention, the data analysis apparatus may further include a third storage unit configured to store information on a distance between relay apparatuses having communication areas adjacent to each other among the plurality of relay apparatuses, and a distance calculating unit configured to calculate a moving distance of the wireless terminal at each time, using the information on the distance stored in the third storage unit, based on the position of the wireless terminal at each time which is estimated by the position estimation unit.

Further, in the data analysis system according to embodiments of the present invention, the data analysis apparatus may calculate a moving path of the wireless terminal at each time based on the position of the wireless terminal at each time which is estimated by the position estimation unit.

Further, in the data analysis system according to embodiments of the present invention, the data analysis apparatus may further include a display unit configured to display an analysis result obtained by the analysis unit, and the display unit may include a display device configured to display information on the position of the wireless terminal in the region at each time which is analyzed by the analysis unit.

Furthermore, in the data analysis system according to embodiments of the present invention, the time imparted to the determination result by the time imparting unit may be a time that is synchronized between the plurality of relay apparatuses.

In order to solve the problems described above, a data analysis method according to embodiments of the present invention is a data analysis method including a plurality of relay apparatuses and a data analysis apparatus, the plurality of relay apparatuses being disposed in a predetermined region, each of the plurality of relay apparatuses being configured to communicate with a wireless terminal in a communication area of the relay apparatus, the data analysis apparatus being connected to the plurality of relay apparatuses through a communication network and being configured to analyze data regarding the wireless terminal which is received from the plurality of relay apparatuses, the method including a first step of determining, by each of the plurality of relay apparatuses, whether or not the wireless terminal is present in the communication area at fixed time intervals, a second step of imparting, by each of the plurality of relay apparatuses, a time at which the determination is performed to the determination result in the first step, and a third step of transmitting, by each of the plurality of relay apparatuses, the determination result to the data analysis apparatus together with the imparted time, a fourth step of receiving, by the data analysis apparatus, the determination result together with the imparted time, a fifth step of analyzing, by the data analysis apparatus, information on the wireless terminal at each time based on the time and the determination result, and a sixth step of displaying, by the data analysis apparatus, an analysis result in the fifth step on a display device.

Effects of Embodiments of the Invention

According to embodiments of the present invention, each of a plurality of relay apparatuses that communicate with a wireless terminal in a communication area determines whether or not the wireless terminal is present in the communication area at fixed time intervals, imparts a time at which the determination is performed to a determination result and transmits the determination result to a data analysis apparatus. Thus, it is possible to more accurately grasp information on a wireless terminal moving between the relay apparatuses.

DETAILED DESCRIPTION OF ILLUSTRATIVE EMBODIMENTS

Hereinafter, a preferred embodiment of the present invention will be described in detail with reference to FIGS. 1 to 13B.

Outline of Data Analysis System

First, an outline of a configuration of a data analysis system according to an embodiment of the present invention will be described with reference to FIG. 1. In the data analysis system, a plurality of relay apparatuses 1 and a data analysis apparatus 2 are connected to each other through a communication network NW. The plurality of relay apparatuses 1 are disposed in a predetermined region.

Each of the relay apparatuses 1 has its own communication area, and a predetermined region is covered by a plurality of the communication areas. A wireless terminal 3 can move between the relay apparatuses 1 and communicate with the relay apparatuses 1 in the respective communication areas. Each of the plurality of relay apparatuses 1 determines whether or not the wireless terminal 3 is present in its own communication area at fixed time intervals, imparts a time at which the determination is performed to a determination result, and transmits the determination result to the data analysis apparatus 2 through the communication network NW.

The data analysis apparatus 2 analyzes information on the wireless terminal 3 based on the received determination result and the time at which the determination is performed, and displays an analysis result on a display device 208 to be described later.

Rehabilitation Support System

Hereinafter, as a specific example of the data analysis system described above, a rehabilitation support system will be described that analyzes positional information, a moving distance, and a moving path of a user who performs rehabilitation for restoring a motor function or the like (hereinafter simply referred to as "rehabilitation") and presents an analysis result to an administrator. Examples of the user include a hospital patient. An administrator such as a doctor needs to grasp information such as the user's daily moving amount and activity amount indoors in a hospital or the like.

Figure 1:
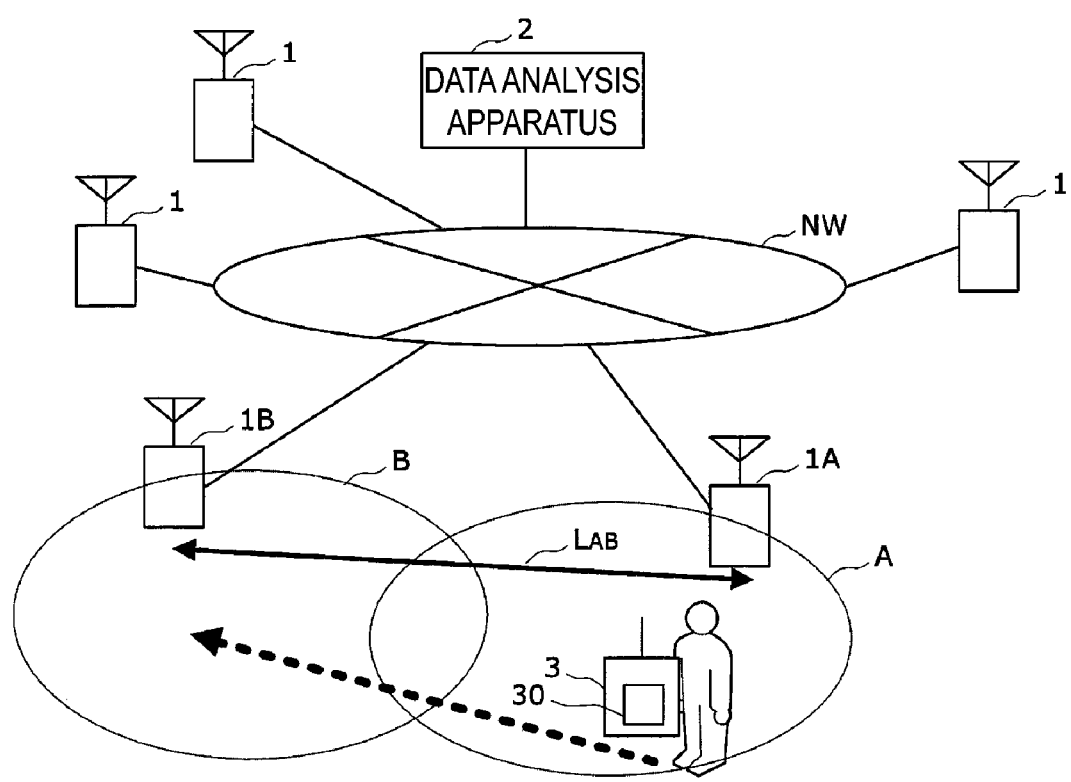
FIG. 1 is a block diagram illustrating an outline of a data analysis system according to an embodiment of the present invention.

In the rehabilitation support system, the user wears or carries the wireless terminal 3 and moves inside a facility on foot or the like as illustrated in FIG. 1. The wireless terminal 3 includes a wireless communication interface 30 and transmits specific identification information to the corresponding relay apparatus 1. Regarding the identification information, a MAC address, identification information associated with user information in advance, or the like can be used. In addition, a wearable terminal such as a wristband type or a clothes-attachable type, a smartphone, or the like can be used as the wireless terminal 3.

Each relay apparatus 1 has its own communication area and is disposed at a predetermined location in the facility (within the region) such as a hospital. As illustrated in FIG. 1, the plurality of relay apparatuses 1 are disposed in the facility. Each relay apparatus 1 and the wireless terminal 3 perform wireless communication through a network such as a wireless LAN, Bluetooth (trade name), and the like.

For example, as illustrated in FIG. 1, the user wearing the wireless terminal 3 moves on foot from a communication area A of the relay apparatus 1A to a communication area B. Then, a relay apparatus 1B determines that the wireless terminal 3 is present in the communication area B. On the other hand, at the same time, the relay apparatus 1A determines that the wireless terminal 3 is not present in the communication area A. Each of the relay apparatuses 1A and 1B transmits a determination result and the time at which the determination is performed to the data analysis apparatus 2 through the communication network NW. Note that the relay apparatuses 1A and 1B execute determination processing at fixed time intervals based on the time synchronized between the relay apparatuses 1.

In the present embodiment, a position at which the relay apparatus 1 having detected the wireless terminal 3 is disposed in the region or a position of the communication area in the region is used as information indicating a position of the user in the region. In addition, a distance between the relay apparatuses 1 is used as a moving distance of the user.

In addition, for ease of description, it is assumed that a preset relay apparatus 1 preferentially communicates with the wireless terminal 3 in an overlapping communication area of the plurality of relay apparatuses 1.

As described above, each relay apparatus 1 determines whether or not the wireless terminal 3 previously registered in a database is present in its own communication area at fixed time intervals, and imparts a time at which the determination is performed to a determination result. The relay apparatus 1 transmits the imparted time and the determination result to the data analysis apparatus 2 through the communication network NW.

The data analysis apparatus 2 determines a position, a moving distance, and a moving path of the wireless terminal 3 at each time in the region based on the time and the determination result received from each relay apparatus 1, and displays the position, the moving distance, and the moving path on the display device 208 as analysis results. For example, analysis results for each user are presented to an administrator who manages the user's rehabilitation, such as a doctor or a caregiver.

Functional Blocks of Relay Apparatus

Figure 2:
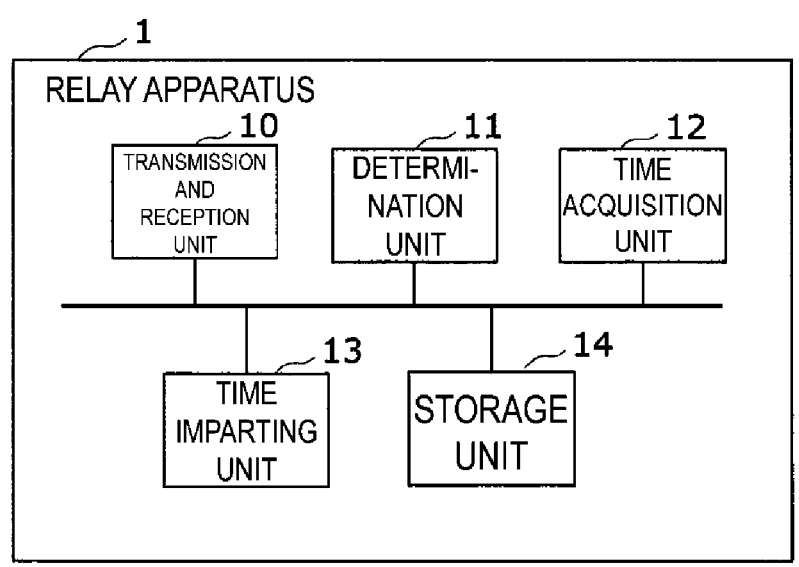
FIG. 2 is a block diagram illustrating a configuration of a relay apparatus according to the present embodiment.

Next, an example of functional blocks of each relay apparatus 1 will be described with reference to FIG. 2.

The relay apparatus 1 includes a transmission and reception unit (first reception unit) 10, a determination unit 11, a time acquisition unit 12, a time imparting unit 13, and a storage unit (first storage unit) 14.

The transmission and reception unit 10 functions as a communication interface and receives the specific identification information from the wireless terminal 3 in the communication area through wireless communication. For example, the transmission and reception unit 10 establishes a communication link by performing initial setting and communication negotiation in wireless communication with the wireless terminal 3 that has entered the communication area of the own relay apparatus. When the communication link is established, the transmission and reception unit 10 can receive data including the identification information received from the wireless terminal 3.

Furthermore, the transmission and reception unit 10 transmits, to the data analysis apparatus 2 through the communication network NW, a determination result obtained by the determination unit 11 to be described later and a time imparted to the determination result by the time imparting unit 13. Note that a wired LAN, a wireless LAN, or the like in the facility is used as the communication network NW. The transmission and reception unit 10 includes a communication control circuit complying with a communication standard adopted in the communication network NW and a wireless communication standard for communicating with the wireless terminal 3.

The determination unit 11 determines whether or not the wireless terminal 3, the identification information of which is registered in the storage unit 14 to be described later, is present in the communication area of the own relay apparatus at fixed time intervals. For example, in a case where the identification information received from the wireless terminal 3 matches the identification information stored in the storage unit 14, the determination unit 11 determines that the wireless terminal 3 is present in the communication area of the own relay apparatus. On the other hand, in a case where the identification information is not received from the wireless terminal 3 at timings when the determination unit 11 performs the determination at fixed time intervals, it is determined that the wireless terminal 3 is not present in the communication area.

For example, in a case where the plurality of wireless terminals 3 move between the relay apparatuses 1, the determination unit 11 determines whether or not every wireless terminal 3 is present in the communication area of the own relay apparatus at fixed time intervals. In a case where identification information is received from a certain wireless terminal 3 at a certain time, it is determined that the wireless terminal 3 is present in the communication area, and the other wireless terminals 3 are not present in the communication area.

Note that the determination unit 11 may perform the determination, for example, at intervals of one second as the fixed time intervals. The fixed time intervals can be set to sufficiently short time intervals so that it is detected that the user wearing or carrying the wireless terminal 3 is present in any one communication area at least once when the user moves between the plurality of relay apparatuses 1.

The time acquisition unit 12 acquires the time synchronized between the relay apparatuses 1. For example, the time acquisition unit 12 can acquire the time through the communication network NW from a time server not illustrated in the drawing.

The time imparting unit 13 imparts the time acquired by the time acquisition unit 12 to the determination result obtained by the determination unit 11. Specifically, the time imparting unit 13 imparts, to the determination result, the time corresponding to the preset fixed time intervals at which the determination unit 11 executes the determination processing.

The determination result to which the time is imparted by the time imparting unit 13 is transmitted from the transmission and reception unit 10 to the data analysis apparatus 2 through the communication network NW. For example, a timing at which the determination result is transmitted may correspond to the fixed time intervals at which the determination unit 11 performs the determination processing.

The storage unit 14 stores identification information specific to the wireless terminal 3. For example, the storage unit 14 stores identification information of the plurality of wireless terminals 3 as a database. A user is identified by the identification information of the wireless terminal 3. Furthermore, the storage unit 14 stores identification information specific to the communication area to which the own relay apparatus belongs.

Functional Blocks of Data Analysis Apparatus

Figure 3:
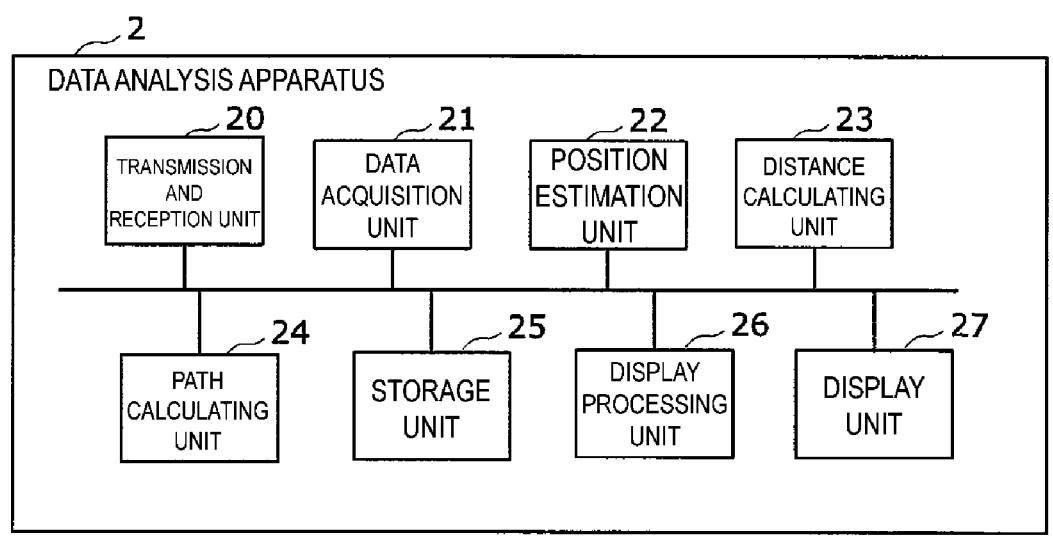
FIG. 3 is a block diagram illustrating a configuration of the data analysis apparatus according to the present embodiment.

Next, an example of functional blocks of the data analysis apparatus 2 will be described with reference to FIG. 3.

The data analysis apparatus 2 includes a transmission and reception unit (second reception unit) 20, a data acquisition unit 21, a position estimation unit 22, a distance calculating unit 23, a path calculating unit 24, a storage unit (second storage unit, third storage unit) 25, a display processing unit 26, and a display unit 27. The position estimation unit 22, the distance calculating unit 23, and the path calculating unit 24 constitute an analysis unit that analyzes information on the wireless terminal 3.

The transmission and reception unit 20 functions as a communication interface and receives a determination result and a time imparted to the determination result, which are transmitted by the relay apparatus 1 through the communication network NW. Specifically, as illustrated in FIG. 1, the transmission and reception unit 20 can receive the determination result at fixed time intervals from each of the plurality of relay apparatuses 1.

The data acquisition unit 21 acquires identification information of the wireless terminal 3, time information, and identification information of the relay apparatus 1 which is a transmission source based on the determination result and the time imparted to the determination result which are received by the transmission and reception unit 20.

The position estimation unit 22 estimates a position at which the wireless terminal 3 is present in the facility at each time of fixed time intervals, based on the time, the determination result, and the identification information of the relay apparatus 1 which is a transmission source of the determination result. In more detail, the position estimation unit 22 can estimate the current position of the wireless terminal 3 having specific identification information in the facility from the identification information indicating the communication area of the relay apparatus 1 updated at fixed time intervals $\Delta t = t_x - t_{x-1}$ (x=1, 2, ..., n).

Even in a case where there are a plurality of wireless terminals 3, the position estimation unit 22 similarly estimates the position of each wireless terminal 3 in the facility at each time.

The distance calculating unit 23 calculates a moving distance of the wireless terminal 3 based on the position of the wireless terminal 3 at each time estimated by the position estimation unit 22, with reference to information indicating a distance between the relay apparatuses 1 stored in the storage unit 25 to be described later. For example, the distance calculating unit 23 adds, to a moving distance at a time $t_{x-1}$, a distance between the relay apparatuses 1 identified by the identification information indicating the communication area of the relay apparatus 1 at a time $t_x$ and the identification information indicating the communication area of the relay apparatus 1 at a time $t_x$, with an initial value as zero, so that the distance calculating unit 23 may calculate a moving distance at time $t_x$.

The path calculating unit 24 calculates a moving path of the wireless terminal 3 at each time, based on the position of the wireless terminal 3 at each time which is estimated by the position estimation unit 22. For example, the path calculating unit 24 may calculate the path of the wireless terminal 3 having specific identification information at the time $t_x$ by accumulating changes in the identification information of the relay apparatus 1 updated at fixed time intervals ($t_x$, $t_{x-1}$, ...).

Furthermore, the path calculating unit 24 may calculate a cumulative number of relay apparatuses 1 through which the wireless terminal 3 has passed at each time. In more detail, when the relay apparatus 1 having a communication area corresponding to the position of the wireless terminal 3 at the time $t_x$ is different from the relay apparatus 1 having a communication area corresponding to the position of the wireless terminal 3 at the time $t_{x-1}$, the path calculating unit 24 adds one to the cumulative number of relay apparatuses 1 through which the wireless terminal has passed at the time $t_{x-1}$. The path calculating unit adds zero in a case where the relay apparatuses are the same.

The storage unit 25 stores information in which identification information of each relay apparatus 1 is associated with the communication area or the position where each relay apparatus is disposed in the facility. Furthermore, the storage unit 25 stores information indicating a distance between the relay apparatuses 1 having communication areas adjacent to each other. In addition, the storage unit 25 stores calculation results obtained from the position estimation unit 22, the distance calculating unit 23, and the path calculating unit 24.

The display processing unit 26 edits the calculation results obtained from the position estimation unit 22, the distance calculating unit 23, and the path calculating unit 24, and processes the results using a style sheet or the like to generate a table, a graph, or the like. For example, the display processing unit 26 generates display data such as a table or a graph obtained by collecting, for each wireless terminal 3, identification information of the relay apparatus 1, a moving distance, a moving path of the wireless terminal 3, and the number of relay apparatuses 1 through which the wireless terminal 3 has passed at each time. The display processing unit 26 can also generate display data indicating an average of these pieces of information of the plurality of wireless terminals 3, and the like.

The display unit 27 displays a table or a graph on a display screen, based on the display data for each wireless terminal 3 which is generated by the display processing unit 26. Specifically, a temporal change in identification information of the relay apparatus 1 representative of the current position of the wireless terminal 3 and a graph for a moving distance of the wireless terminal 3 or a cumulative number of relay apparatuses 1 through which the wireless terminal 3 has passed can be displayed for each wireless terminal 3. In addition, the display unit 27 can perform mapping display by superimposing a moving path of the wireless terminal 3 on a layout map in which the positions of the plurality of relay apparatuses 1 disposed in the facility are illustrated. Note that the layout map in which the positions of the disposed relay apparatuses are illustrated is stored in the storage unit 25.

Computer Configuration of Relay Apparatus

Next, an example of a configuration of a computer for achieving each relay apparatus 1 having the above-described functions will be described with reference to FIG. 4.

Figure 4:
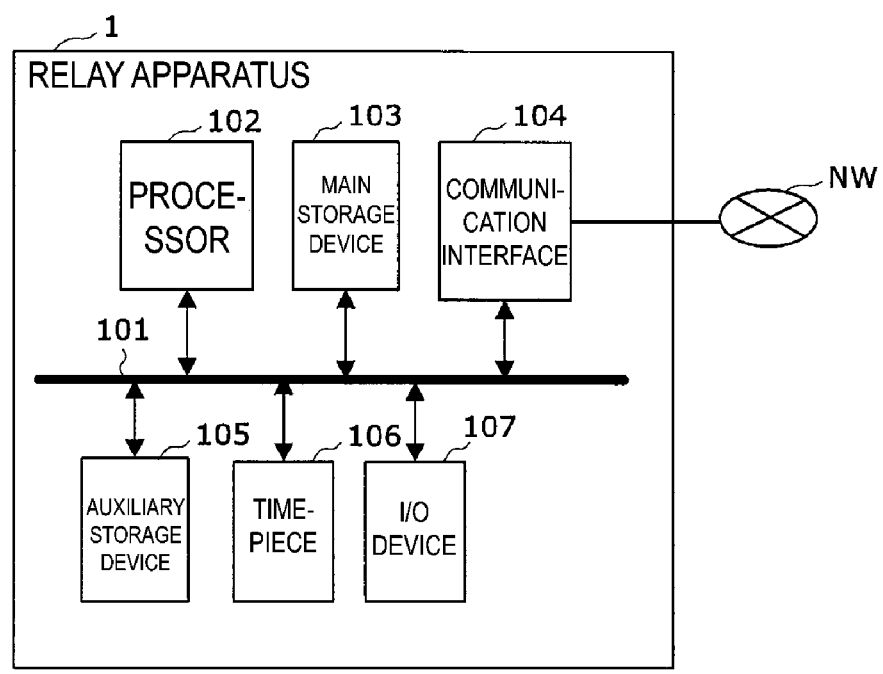
FIG. 4 is a block diagram illustrating an example of a computer configuration for achieving the relay apparatus.

As illustrated in FIG. 4, the relay apparatus 1 may be achieved by, for example, a computer including a processor 102, a main storage device 103, a communication interface 104, an auxiliary storage device 105, a timepiece 106, and an input/output (I/O) device 107 connected to each other through a bus 101, and a program for controlling these hardware resources.

A program used by the processor 102 to perform various types of control and arithmetic operations is stored in advance in the main storage device 103. The functions of the relay apparatus 1 including the determination unit 11 illustrated in FIG. 2 are implemented by the processor 102 and the main storage device 103.

The communication interface 104 is an interface circuit for communicating with various types of external electronic equipment through the communication network NW.

Examples of the communication interface 104 include an arithmetic interface and an antenna that comply with wireless data communication standards such as LTE, 3G, a wireless LAN, and Bluetooth (trade name). The transmission and reception unit 10 illustrated in FIG. 2 is achieved by the communication interface 104.

The auxiliary storage device 105 includes a readable/writable storage medium, and a drive device for reading and writing various types of information such as a program and data from and in the storage medium. A semiconductor memory such as a hard disk or a flash memory serving as a storage medium can be used as the auxiliary storage device 105.

The auxiliary storage device 105 includes a storage region for storing a database in which identification information of the plurality of wireless terminals 3 is registered, and a program storage region for storing a program for causing the relay apparatus 1 to perform the determination processing. The storage unit 14 illustrated in FIG. 2 is achieved by the auxiliary storage device 105. Further, the auxiliary storage device 105 may include, for example, a backup area and the like for backing up the above-described data, programs, and the like.

The timepiece 106 includes a built-in timepiece or the like of the computer and clocks a time. Alternatively, the timepiece 106 may acquire time information from a time server not illustrated in the drawing. The time acquisition unit 12 illustrated in FIG. 2 is achieved by the timepiece 106.

The I/O device 107 includes an I/O terminal that inputs a signal received from external equipment and outputs a signal to the external equipment.

Computer Configuration of Data Analysis Apparatus

Next, an example of a configuration of a computer for achieving the data analysis apparatus 2 having the above-described functions will be described with reference to FIG. 5. The data analysis apparatus 2 can be achieved by a computer similar to the relay apparatus 1 illustrated in FIG. 4.

Figure 5:
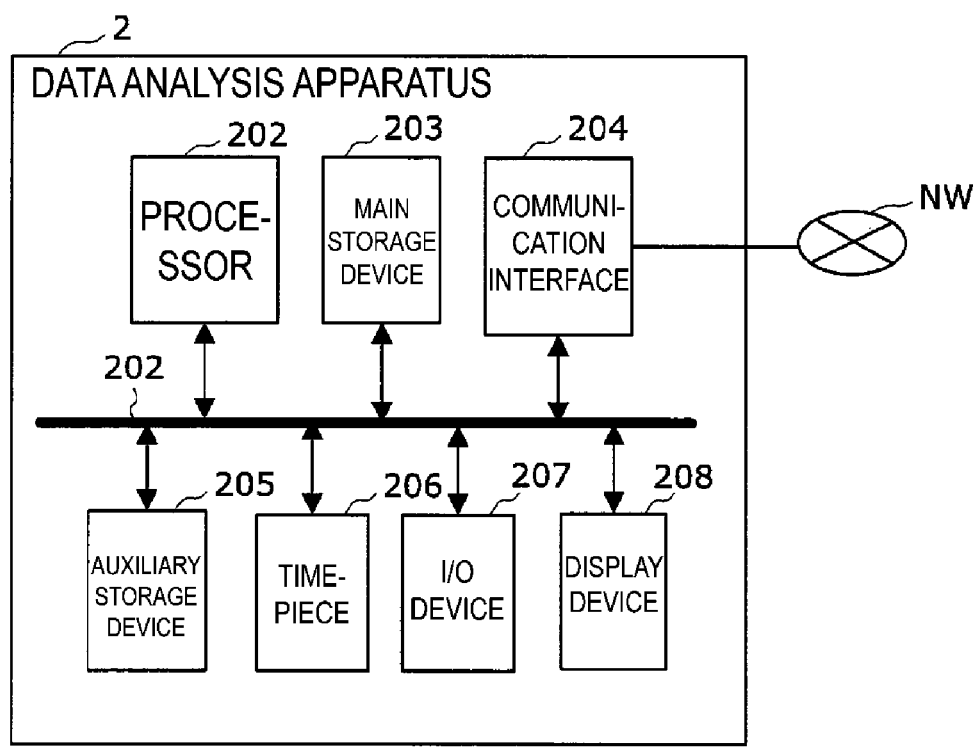
FIG. 5 is a block diagram illustrating an example of a computer configuration for achieving the data analysis apparatus.

As illustrated in FIG. 5, the data analysis apparatus 2 can be achieved by, for example, a computer including a processor 202, a main storage device 203, a communication interface 204, an auxiliary storage device 205, a timepiece 206, an input/output (I/O) device 207, and a display device 208 connected to each other through a bus 201, and a program for controlling these hardware resources.

A program used by the processor 202 to perform various types of control and arithmetic operations is stored in advance in the main storage device 203. The functions of the data analysis apparatus 2 including the position estimation unit 22, the distance calculating unit 23, and the path calculating unit 24 illustrated in FIG. 3 are implemented by the processor 202 and the main storage device 203.

The auxiliary storage device 205 includes a storage region for storing identification information of the plurality of relay apparatuses 1 and identification information indicating a communication area, and a program storage region for storing a program for performing position estimation of the wireless terminal 3 and calculation processing of a moving distance and a moving path. The storage unit 25 illustrated in FIG. 3 is achieved by the auxiliary storage device 205. Further, the auxiliary storage device 205 may include, for example, a backup area for backing up the above-described data, programs, and the like.

The timepiece 206 includes a built-in timepiece or the like of the computer and clocks time. Alternatively, the timepiece 206 may acquire time information from a time server not illustrated in the drawing. Note that the time of the timepiece 206 and the time of the timepiece 106 of each relay apparatus 1 are synchronized with each other.

The display device 208 is achieved by a liquid crystal display or the like. The display unit 27 illustrated in FIG. 3 is achieved by the display device 208.

Operating Sequence of Rehabilitation Support System

Figure 6:
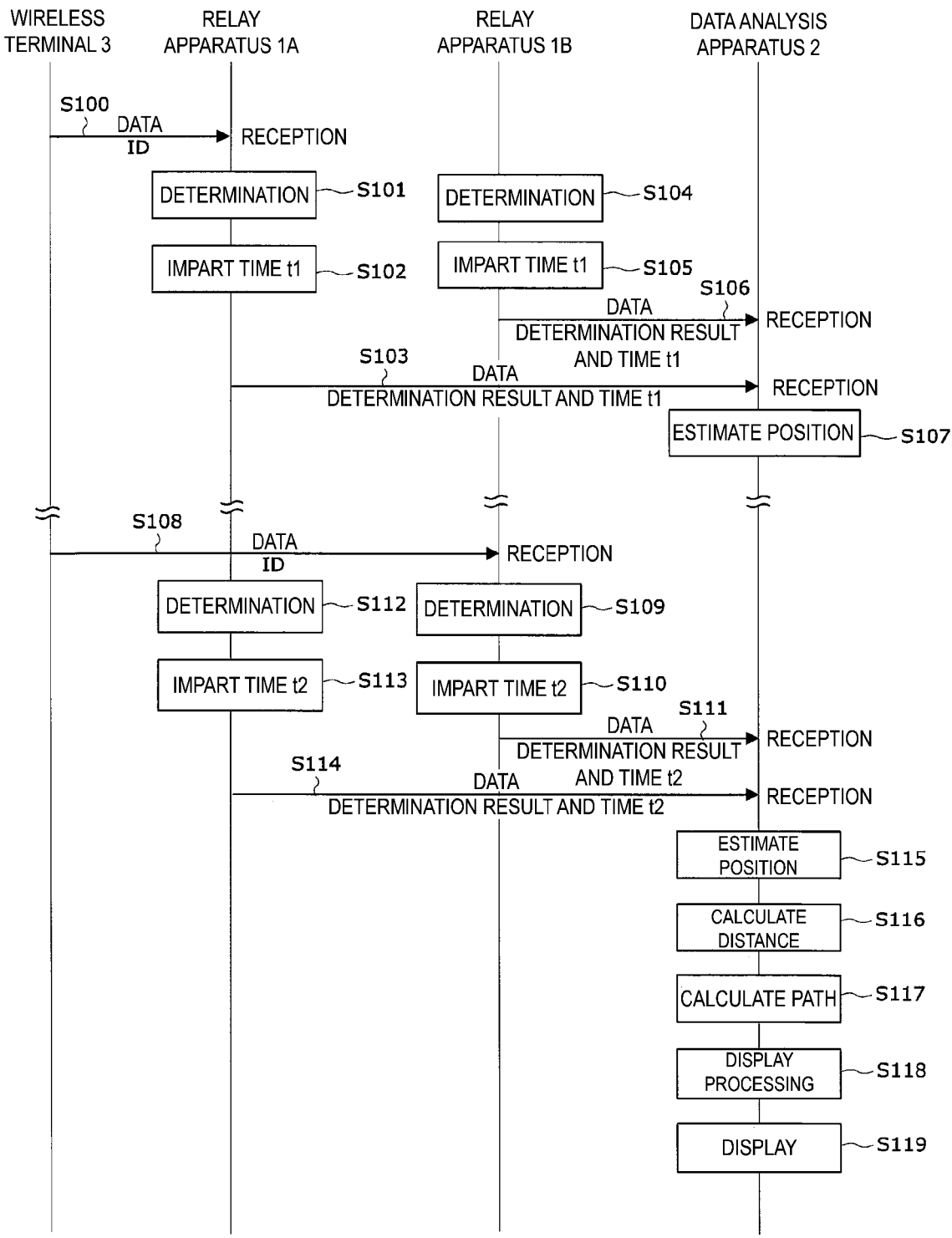
FIG. 6 is a sequence diagram illustrating an operation of the data analysis system according to the present embodiment.

Next, an operation of the rehabilitation support system having the above-described configuration will be described with reference to FIG. 1 and FIG. 6. As a premise, identification information of the wireless terminal 3 is stored in advance in the storage units 14 of the relay apparatuses 1A and 1B. In addition, the storage unit 25 of the data analysis apparatus 2 stores, in advance, identification information of the relay apparatuses 1A and 1B, each of which is disposed at a predetermined indoor location such as a hospital and has its own communication area, and identification information of the communication areas. In addition, the relay apparatus 1 performs determination processing at fixed time intervals t1 and t2.

First, as illustrated in FIG. 1, a user wearing the wireless terminal 3 moves into the communication area A from outside the communication area A. When the wireless terminal 3 enters the communication area A, the wireless terminal 3 establishes a link for wireless communication with the relay apparatus 1A. The wireless terminal 3 transmits identification information specific to the wireless terminal 3 to the relay apparatus 1A (step S100). The relay apparatus 1A determines that the wireless terminal 3 is present in the communication area A from the received identification information at a time t1 (step S101).

Next, in the relay apparatus 1A, the time imparting unit 13 imparts, to a determination result, the time t1 synchronized with the time of the system which is acquired by the time acquisition unit 12 (step S102). Next, the relay apparatus 1A transmits the imparted time t1 and the determination result to the data analysis apparatus 2 from the transmission and reception unit 20 (step S103).

On the other hand, the relay apparatus 1B determines that the wireless terminal 3 is not present in the communication area B at the time t1 (step S104). The time t1 is imparted to a determination result (step S105), and the determination result is transmitted to the data analysis apparatus 2 (step S106).

Next, the data analysis apparatus 2 estimates the position of the wireless terminal 3 at the time t1, based on the determination result to which the time t1 is imparted, which is transmitted from the relay apparatus 1A, and the determination result to which the time t1 is imparted, which is from the relay apparatus 1B (step S107). Specifically, the position estimation unit 22 estimates that the position of the wireless terminal 3 at the time t1 is in the communication area A. An estimation result is stored in the storage unit 25 together with time t1.

Thereafter, the user wearing the wireless terminal 3 moves away from the communication area A and moves into the adjacent communication area B. When the wireless terminal 3 enters the communication area B, the wireless terminal 3 establishes a link for wireless communication with the relay apparatus 1B and transmits the identification information of the wireless terminal 3 to the relay apparatus 1B (step S108). Thereafter, the determination unit 11 of the relay apparatus 1B determines that the wireless terminal 3 is present in the communication area B at a time t2, based on the received identification information of the wireless terminal 3 (step S109).

Next, the time imparting unit 13 imparts the time t2 to a determination result (step S110). Thereafter, the relay apparatus 1B transmits the determination result, the time t2, and the identification information of the relay apparatus 1B to the data analysis apparatus 2 from the transmission and reception unit 10 (step S111).

On the other hand, the relay apparatus 1A also performs determination processing at the time t2, and determines that the wireless terminal 3 is not present in the communication area A (step S112). Next, the time t2 is imparted to a determination result (step S113), and the determination result is transmitted to the data analysis apparatus 2 (step S114).

Thereafter, the position estimation unit 22 of the data analysis apparatus 2 estimates the position of the wireless terminal 3 at the time t2, based on the determination result to which the time t2 is imparted, which is transmitted from the relay apparatus 1B, and the determination result to which the time t2 is imparted, which is transmitted from the relay apparatus 1A (step S115). Specifically, the position estimation unit 22 estimates that the position of the wireless terminal 3 at the time t2 is in the communication area B.

Next, the distance calculating unit 23 calculates a moving distance of the wireless terminal 3, based on the positions of the wireless terminal 3 at the times t1 and t2 which are estimated by the position estimation unit 22 (step S116). Specifically, the distance calculating unit 23 calculates a moving distance $L_{AB}$ of the wireless terminal 3 from the communication area A and the communication area B which are the positions of the wireless terminals 3 at the times t1 and t2. The moving distance $L_{AB}$ indicates a distance between the relay apparatuses 1A and 1B.

Thereafter, the path calculating unit 24 calculates a moving path of the wireless terminal 3 from the time t1 to the time t2 (step S117). Specifically, the path calculating unit 24 calculates a moving path "AB" from identification information A of the relay apparatus 1A corresponding to the position of the wireless terminal 3 at the time t1 and identification information B of the relay apparatus 1B corresponding to the position of the wireless terminal 3 at the time t2. In other words, the path calculating unit 24 calculates the moving path by accumulating changes in the identification information of the relay apparatus 1 corresponding to the estimated position of the wireless terminal 3 which is updated at fixed time intervals.

Next, the display processing unit 26 edits information on the position and movement of the wireless terminal 3 over time which are estimated and calculated by the position estimation unit 22, the distance calculating unit 23, and the path calculating unit 24, and generates a table and a graph according to a preset display format (step S118). Thereafter, the display unit 27 displays display data generated by the display processing unit 26 on the display screen (step S119).

A more specific operation of the rehabilitation support system will now be described with reference to FIG. 7 to FIG. 12C. Hereinafter, a case will be described where a plurality of wireless terminals 3a, 3b, and 3c are worn on respective users, and the users move indoors in a hospital or the like which is indicated by the communication areas A and B. In addition, identification information of the plurality of wireless terminals 3a, 3b, and 3c is registered in the storage unit 14 of the relay apparatus 1 in advance.

Figure 7:
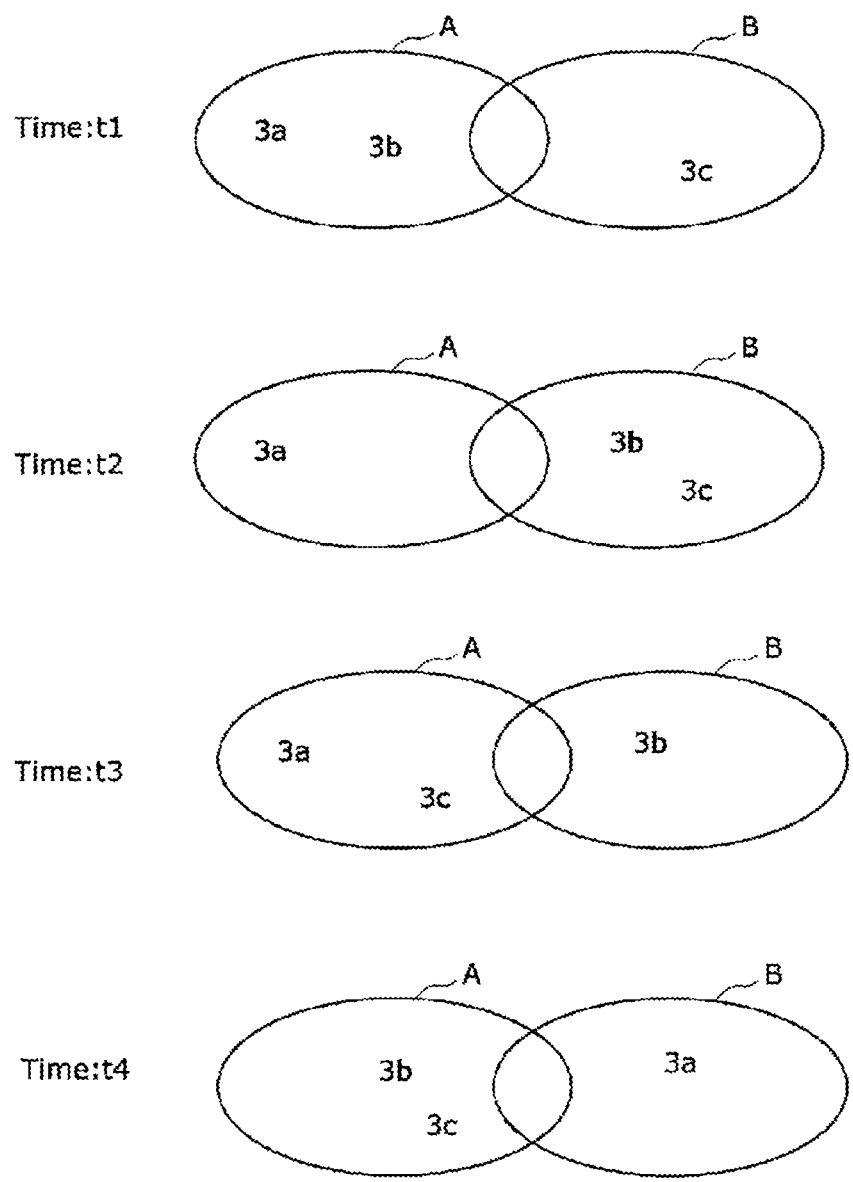
FIG. 7 is a diagram illustrating an operation of the data analysis system according to the present embodiment.

FIG. 7 schematically illustrates changes in the positions of the wireless terminals 3a, 3b, and 3c in the communication areas A and B adjacent to each other at times t1, t2, t3, and t4. At the time t1, the wireless terminals 3a and 3b are present in the communication area A, and the wireless terminal 3c is present in the communication area B.

At the time t2, the wireless terminal 3b moves from the communication area A to the communication area B. Thereafter, the wireless terminal 3c moves from the communication area B to the communication area A at the time t3. Then, at the time t4, the wireless terminal 3a moves from the communication area A to the communication area B, and the wireless terminal 3b moves from the communication area B to the communication area A.

Figure 8A:
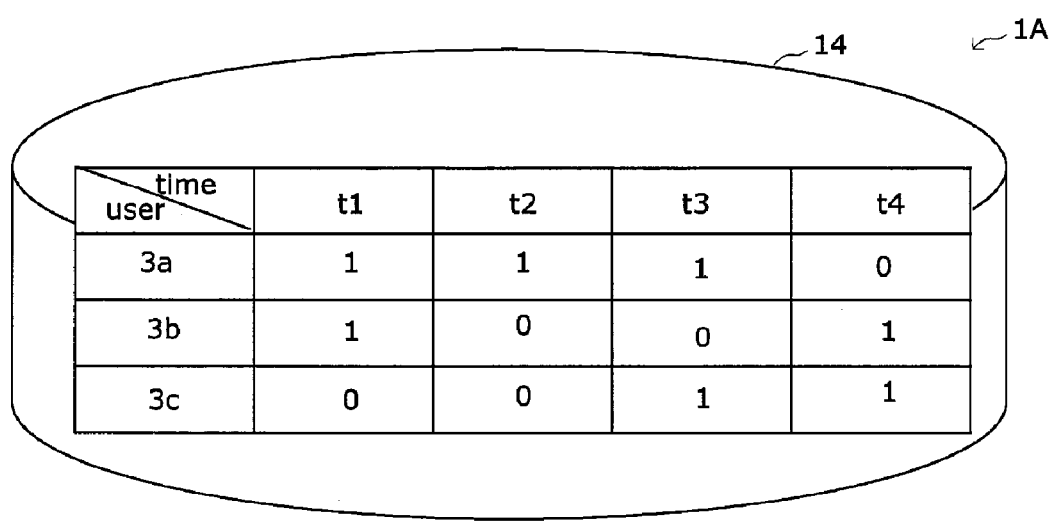
FIG. 8A is a diagram illustrating an operation of the data analysis apparatus according to the present embodiment.

FIG. 8A illustrates determination results at the times t1 to t4 in the relay apparatus 1A according to the movements of the wireless terminals 3a, 3b, and 3c at the respective times illustrated in FIG. 7.

As illustrated in FIG. 8A, the determination unit 11 of the relay apparatus 1A makes a determination "3a: 1, 3b: 1, 3c: 0" because the wireless terminals 3a and 3b are present in the communication area A and the wireless terminal 3c is not present in the communication area A at the time t1. These determination results are transmitted to the data analysis apparatus 2 together with the time t1.

Figure 8B:
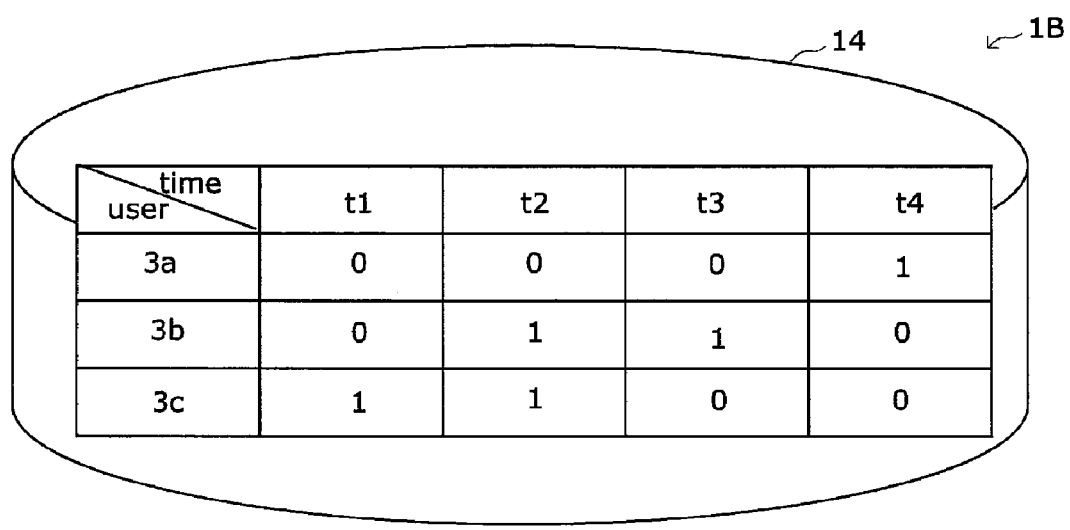
FIG. 8B is a diagram illustrating an operation of the data analysis apparatus according to the present embodiment.

As illustrated in FIG. 8B, the determination unit of the relay apparatus 1B makes a determination "3a: 0, 3b: 0, 3c: 1" because the wireless terminal 3c is present in the communication area B and the wireless terminals 3a and 3b are not present in the communication area B at the time t1. These determination results are transmitted to the data analysis apparatus 2 together with the time t1.

Figure 9:
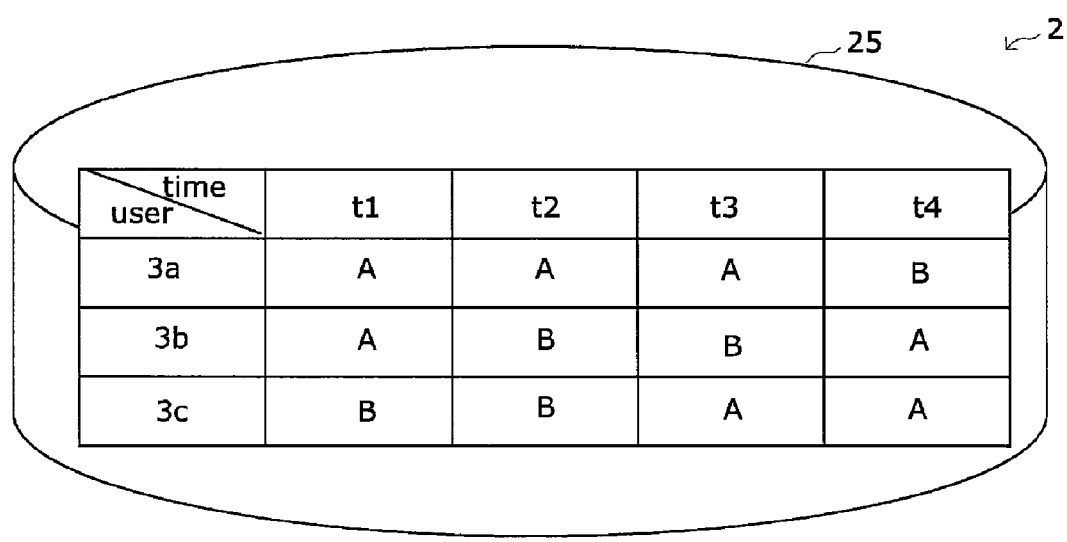
FIG. 9 is a diagram illustrating an operation of the data analysis apparatus according to the present embodiment.

Next, FIG. 9 illustrates the positions of the wireless terminals 3a, 3b, and 3c estimated in the data analysis apparatus 2 from the above-described determination results obtained by the relay apparatuses 1A and 1B. The position estimation unit 22 estimates that the positions of the wireless terminal 3a at the times t1, t2, t3, and t4 are "A, A, A, B", and that the positions of the wireless terminal 3b at the times t1, t2, t3, and t4 are "A, B, B, A" and that the positions of the wireless terminal 3c at the times t1, t2, t3, and t4 are "B, B, A, A". Note that "A" means the communication area A, and "B" means the communication area B.

Based on the positions at each time of the wireless terminals 3a, 3b, and 3c which are estimated by the position estimation unit 22, the path calculating unit 24 calculates the moving paths of the respective terminals from the time t1 to the time t4 as "AAAB," "ABBA," and "BBAA".

Figure 10:
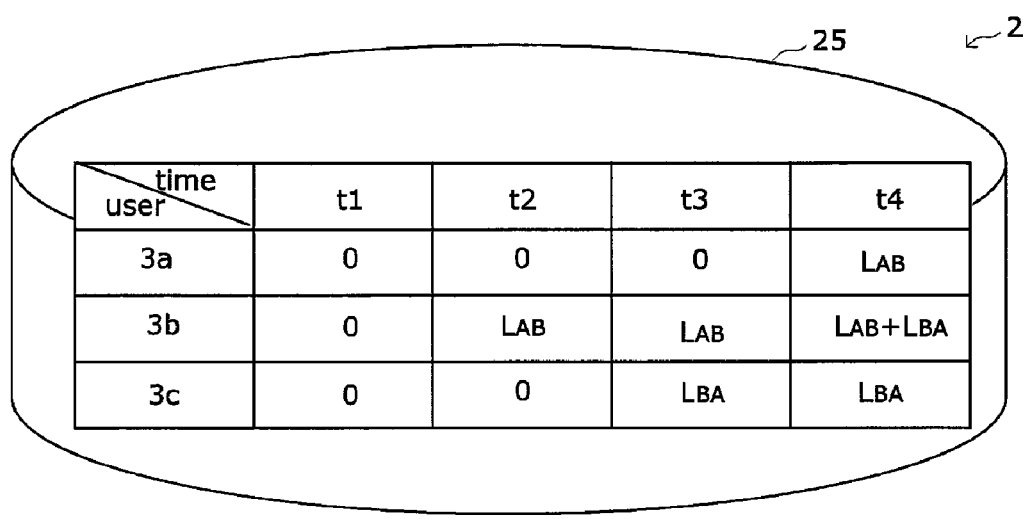
FIG. 10 is a diagram illustrating an operation of the data analysis apparatus according to the present embodiment.

FIG. 10 illustrates moving distances of the wireless terminals 3a, 3b, and 3c at the times t1, t2, t3, and t4 which are calculated by the distance calculating unit 23. The wireless terminal 3a is in the communication area A and a moving distance is "0" from the time t1 to the time t3 and moves to the communication area B at the time t4, and thus the moving distance is calculated as $L_{AB}$.

Regarding the wireless terminal 3b, a moving distance at the time t2 is calculated as $L_{AB}$ and does not change at the time t3. The wireless terminal 3b moves to the communication area A again at the time t4, and thus the moving distance is calculated as $L_{AB}+L_{BA}$. Note that $L_{AB}$ is equal to $L_{BA}$.

The wireless terminal 3c moves from the communication area B into the communication area A at the time t3, and thus a moving distance is calculated as $L_{BA}$. The wireless terminal 3c does not move from the communication area B at the time t4, and thus the moving distance remains to be $L_{BA}$.

Figure 11:
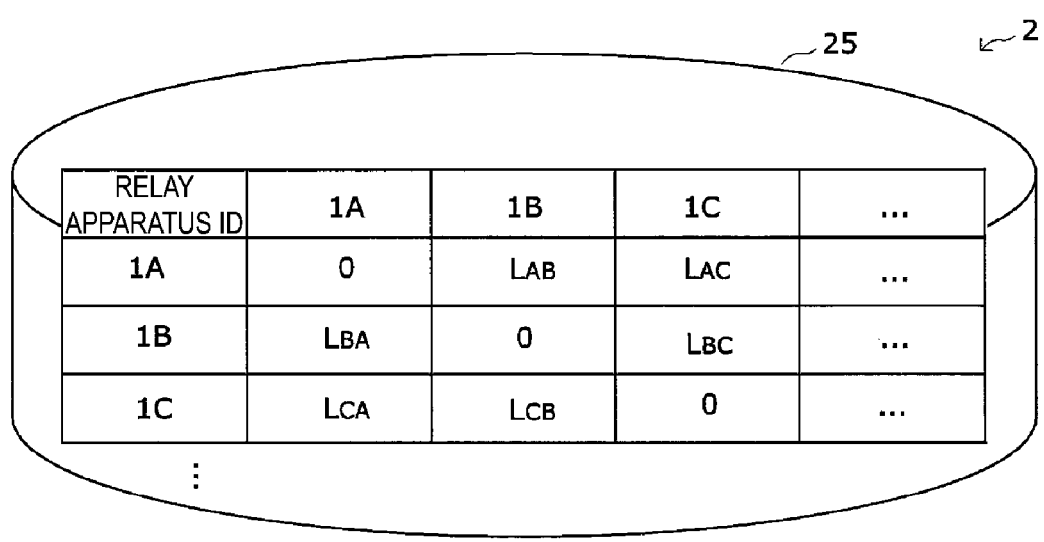
FIG. 11 is a diagram illustrating an operation of the data analysis apparatus according to the present embodiment.

FIG. 11 illustrates a distance between the relay apparatuses 1 which is stored in the storage unit 25 of the data analysis apparatus 2 in advance. In the example of FIG. 11, in addition to distances between the relay apparatuses 1A and 1B adjacent to each other, distances ($L_{CA}$, $L_{AC}$, $L_{CB}$, $L_{BC}$) from the relay apparatus 1C adjacent to the relay apparatuses 1A and 1B are also stored in the storage unit 25 in advance. The distance calculating unit 23 calculates moving distances of the wireless terminals 3a, 3b, and 3c based on the distances between the relay apparatuses 1 illustrated in FIG. 11.

Figure 12A:
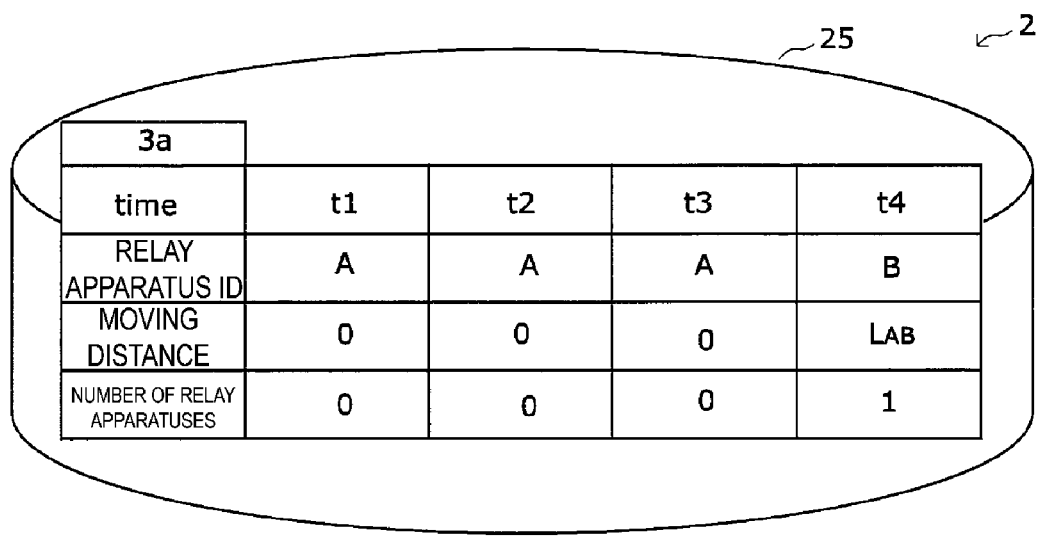
FIG. 12A is a diagram illustrating an operation of the data analysis apparatus according to the present embodiment.
Figure 12B:
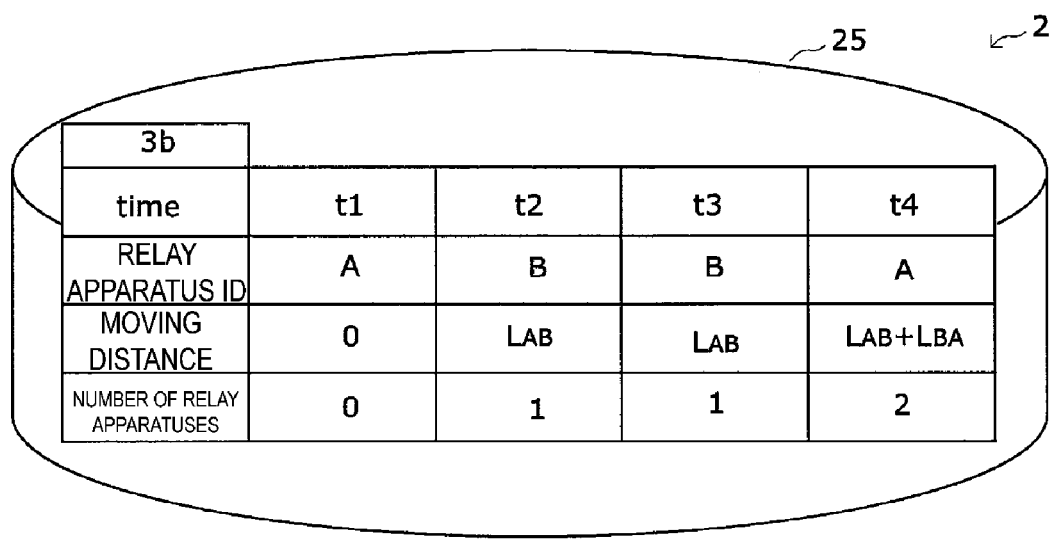
FIG. 12B is a diagram illustrating an operation of the data analysis apparatus according to the present embodiment.
Figure 12C:
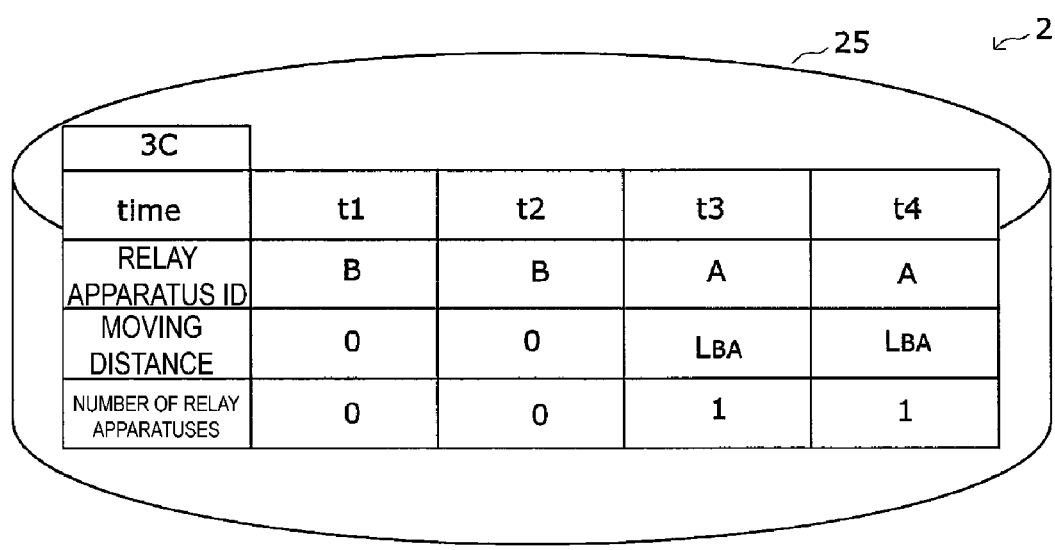
FIG. 12C is a diagram illustrating an operation of the data analysis apparatus according to the present embodiment.

FIGS. 12A to 12C illustrate the positions (relay apparatus IDs) of the wireless terminals 3a, 3b, and 3c, moving distances of the wireless terminals 3a, 3b, and 3c, and the number of relay apparatuses through which the wireless terminals 3a, 3b, and 3c have passed at the times t1, t2, t3, and t4, which are edited and generated by the display processing unit 26.

Figure 13A:
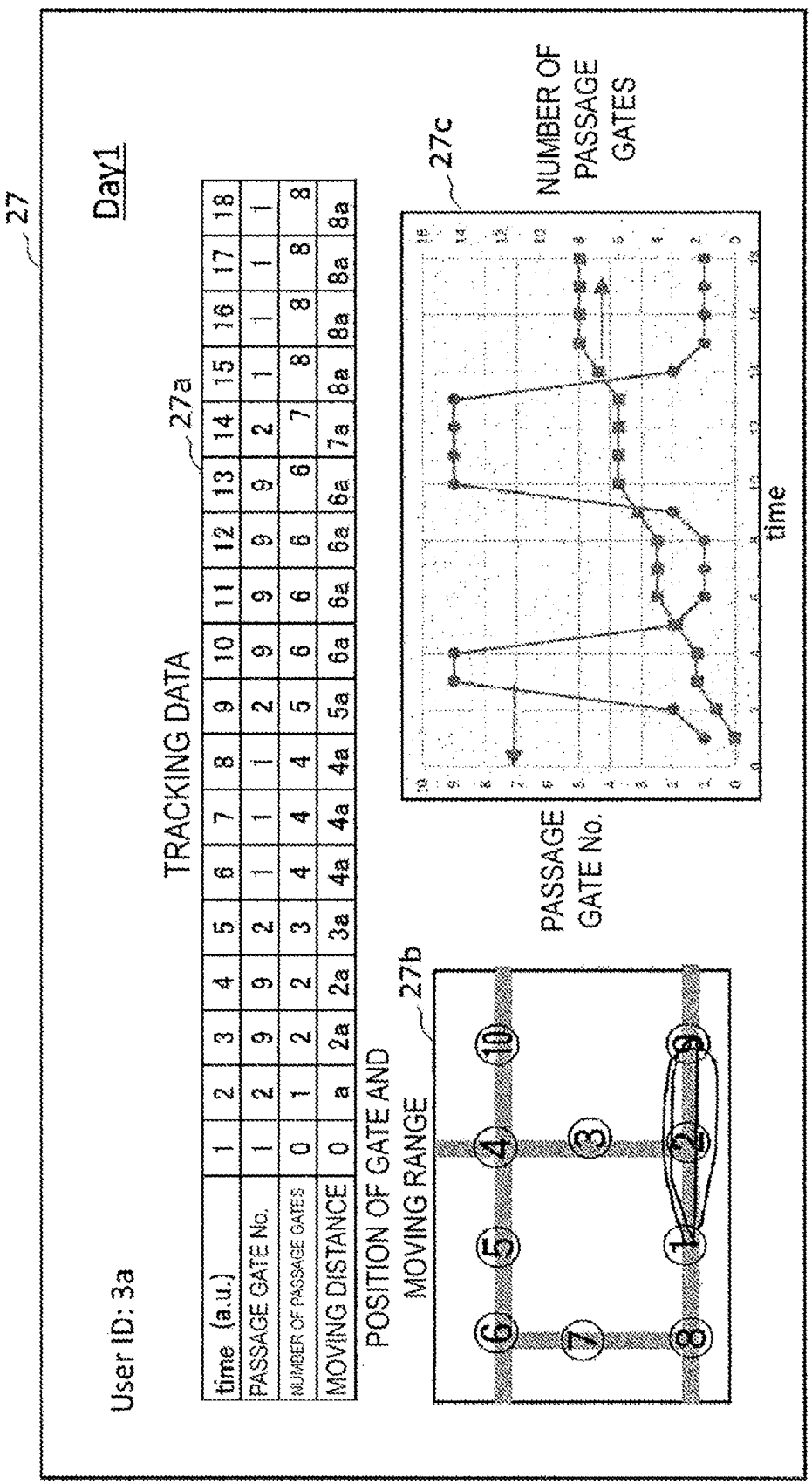
FIG. 13A is a diagram illustrating an example of data displayed on a display unit according to the present embodiment.
Figure 13B:
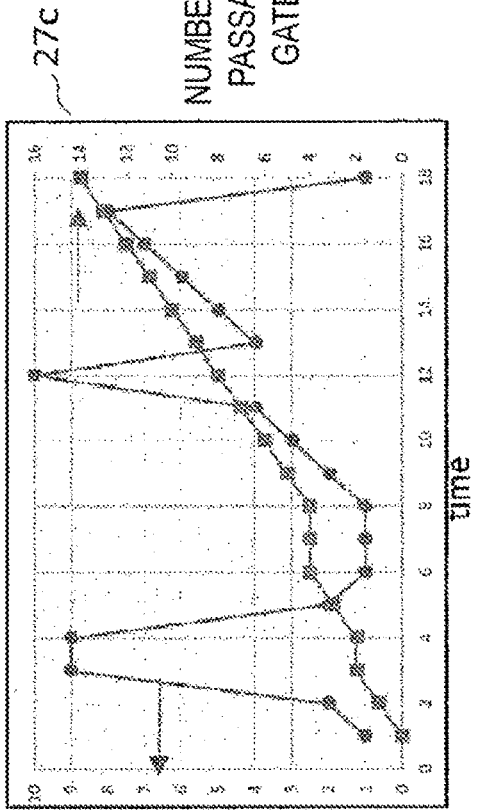
FIG. 13B is a diagram illustrating an example of data displayed on the display unit according to the present embodiment.
Figure 13B:
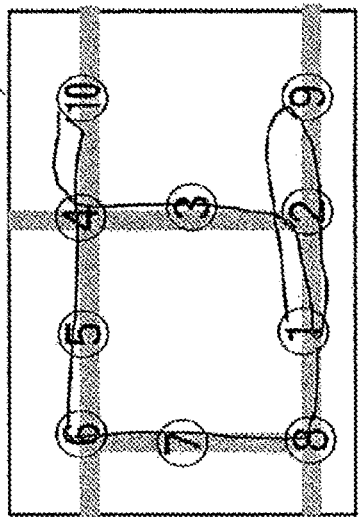

FIGS. 13A and 13B illustrate examples of graphs and drawings displayed on the display screen by the display unit 27. FIGS. 13A and 13B illustrate examples of displayed analysis results on the first day and the second day of the user wearing the wireless terminal 3a.

In FIGS. 13A and 13B, in a display region 27a, a "passage gate No." is displayed as identification information of the relay apparatus 1 at each time, and changes in the number of relay apparatuses through which wireless terminal 3a has passed ("the number of passage gates") and a moving distance are displayed.

A graph shown in a display region 27c is formed by graphing data of the display region 27a. The horizontal axis indicates the time, the left vertical axis indicates the "passage gate no.", and the right vertical axis indicates "the number of passage gates". In the present embodiment, a case is described where distances between the adjacent relay apparatuses 1 are approximately equal to each other. In this case, the number of passage gates is equivalent to a change in a moving distance.

In a display region 27b, indoor paths and the positions of the relay apparatuses 1 are displayed on a layout map, and a moving path of the wireless terminal 3a worn on the user is displayed in an overlapping manner. By performing such mapping display, the range of activity of the user wearing the wireless terminal 3a can be grasped at a glance. For example, a doctor managing a user who is a rehabilitation patient may check the user's range of activity illustrated in the display example of FIG. 13A on the display screen, and may notice that the user is moving in a limited range between the relay apparatuses 1, 2, and 9 and give advice for encouraging the user to walk more actively.

Thus, it is possible to confirm a result indicating that a moving range of the user (the wireless terminal 3a) on the second day illustrated in FIG. 13B expands and that a moving distance indicated by the number of passage gates is also improved.

As described above, according to the rehabilitation support system of the present embodiment, each of the plurality of relay apparatuses 1 determines whether or not the wireless terminal 3 is present in the own communication area at fixed time intervals, imparts a time at which the determination is performed to a determination result, and transmits the determination result to the data analysis apparatus 2. For this reason, it is possible to more accurately grasp information on the position of the wireless terminal 3, and consequently, perform more effective rehabilitation support for a user.

Although an exemplary embodiment of the analysis system and the data analysis method of the present invention has been described above, the present invention is not limited to the described embodiment, and various types of modification that can be conceived by a person skilled in the art can be made within the scope of the invention described in the claims.

REFERENCE SIGNS LIST 1, 1A, 1B, 1C Relay apparatus
2 Data analysis apparatus
3, 3a, 3b, 3c Wireless terminal
10, 20 Transmission and reception unit
11 Determination unit
12 Time acquisition unit
13 Time imparting unit
14, 25 Storage unit
21 Data acquisition unit
22 Position estimation unit
23 Distance calculating unit
24 Path calculating unit
26 Display processing unit
27 Display unit
101, 201 Bus
102, 202 Processor
103, 203 Main storage device
3o Wireless communication interface
104, 204 Communication interface
105, 205 Auxiliary storage device
106, 206 Timepiece
107, 207 Input/output (I/O)
208 Display device

The invention claimed is:

1. A data analysis system comprising:
a plurality of relay apparatuses, wherein each of the relay apparatuses is configured to communicate with a wireless terminal in a communication area, and wherein each of the relay apparatuses comprises:
  a relay apparatus receptor configured to receive information for identifying the wireless terminal from the wireless terminal in the communication area;
  a first storage configured to store the information for identifying the wireless terminal;
  a determiner configured to:
    determine that the wireless terminal is present in the communication area in a case in which the received information for identifying the wireless terminal matches the information for identifying the wireless terminal stored in the first storage; or
    determine that the wireless terminal is not present in the communication area in a case in which the information for identifying the wireless terminal is not received;
  a time imparter configured to impart a time at which the determination is performed to a determination result obtained by the determiner; and
  a transmitter configured to transmit the determination result to a data analysis apparatus together with the imparted time; and
the data analysis apparatus configured to analyze data regarding the wireless terminal, wherein the data analysis apparatus comprises:
  a receptor configured to receive the determination result together with the imparted time; and
  an analyzer configured to analyze information on the wireless terminal at each time.

2. The data analysis system according to claim 1, wherein:
the relay apparatuses are disposed in a predetermined region, and wherein each of the relay apparatuses is configured to communicate with the wireless terminal in the communication area of the respective relay apparatus;
the data analysis apparatus is connected to the plurality of relay apparatuses through a communication network and is configured to analyze data regarding the wireless terminal that is received from the relay apparatuses;
each of the relay apparatuses is configured such that the determiner determines whether or not the wireless terminal is present in the communication area at fixed time intervals; and
the data analysis apparatus is configured such that the analyzer analyzes the information on the wireless terminal at each time, based on the time and the determination result.

3. The data analysis system according to claim 2, wherein:
the data analysis apparatus is configured such that the receptor receives identification information specific to each of the relay apparatuses together with the time and the determination result; and
the data analysis apparatus further comprises:
  a second storage configured to store a position of each of the relay apparatuses in the predetermined region, the position of each of the relay apparatuses being associated with the identification information of each of the relay apparatuses; and
  a position estimator configured to estimate a position in the predetermined region where the wireless terminal is present at the time, based on the time, the determination result, and the identification information of one of the relay apparatuses that is a transmission source of the determination result.

4. The data analysis system according to claim 3, wherein the data analysis apparatus further comprises:
a third storage configured to store information on a distance between ones of the relay apparatuses having communication areas adjacent to each other; and
a distance calculator configured to calculate a moving distance of the wireless terminal at each time, using the information on the distance stored in the third storage, based on the position of the wireless terminal at each time that is estimated by the position estimator.

5. The data analysis system according to claim 3, wherein the data analysis apparatus is configured to calculate a moving path of the wireless terminal at each time based on the position of the wireless terminal at each time that is estimated by the position estimator.

6. The data analysis system according to claim 3, wherein:
the data analysis apparatus further comprises a display configured to display an analysis result obtained by the analyzer; and
the display includes a display device configured to display information on the position of the wireless terminal in the predetermined region at each time that is analyzed by the analyzer.

7. The data analysis system according to claim 1, wherein the time imparted to the determination result by the time imparter is a time that is synchronized between the relay apparatuses.

8. A data analysis method using a plurality of relay apparatuses disposed in a predetermined region, each communicating with a wireless terminal in a communication area of the respective relay apparatus, and a data analysis apparatus connected to the relay apparatuses through a communication network and used for analyzing data regarding the wireless terminal that is received from the relay apparatuses, the method comprising:

receiving information for identifying the wireless terminal from the wireless terminal in the communication area;

storing the information for identifying the wireless terminal in a first storage;

determining, by each of the relay apparatuses, that the wireless terminal is present in the communication area at fixed time intervals in a case in which the received information for identifying the wireless terminal matches the information for identifying the wireless terminal stored in the first storage;

determining that the wireless terminal is not present in the communication area in a case in which the information for identifying the wireless terminal is not received imparting, by each of the relay apparatuses, a time at which the determination is performed to a determination result;

transmitting, by each of the relay apparatuses, the determination result to the data analysis apparatus together with the imparted time;

receiving, by the data analysis apparatus, the determination result together with the imparted time;

analyzing, by the data analysis apparatus, information on the wireless terminal at each time based on the time and the determination result; and by the data analysis apparatus, an analysis result on a display device.

\* \* \* \* \*